UNITED STATES PATENT OFFICE.

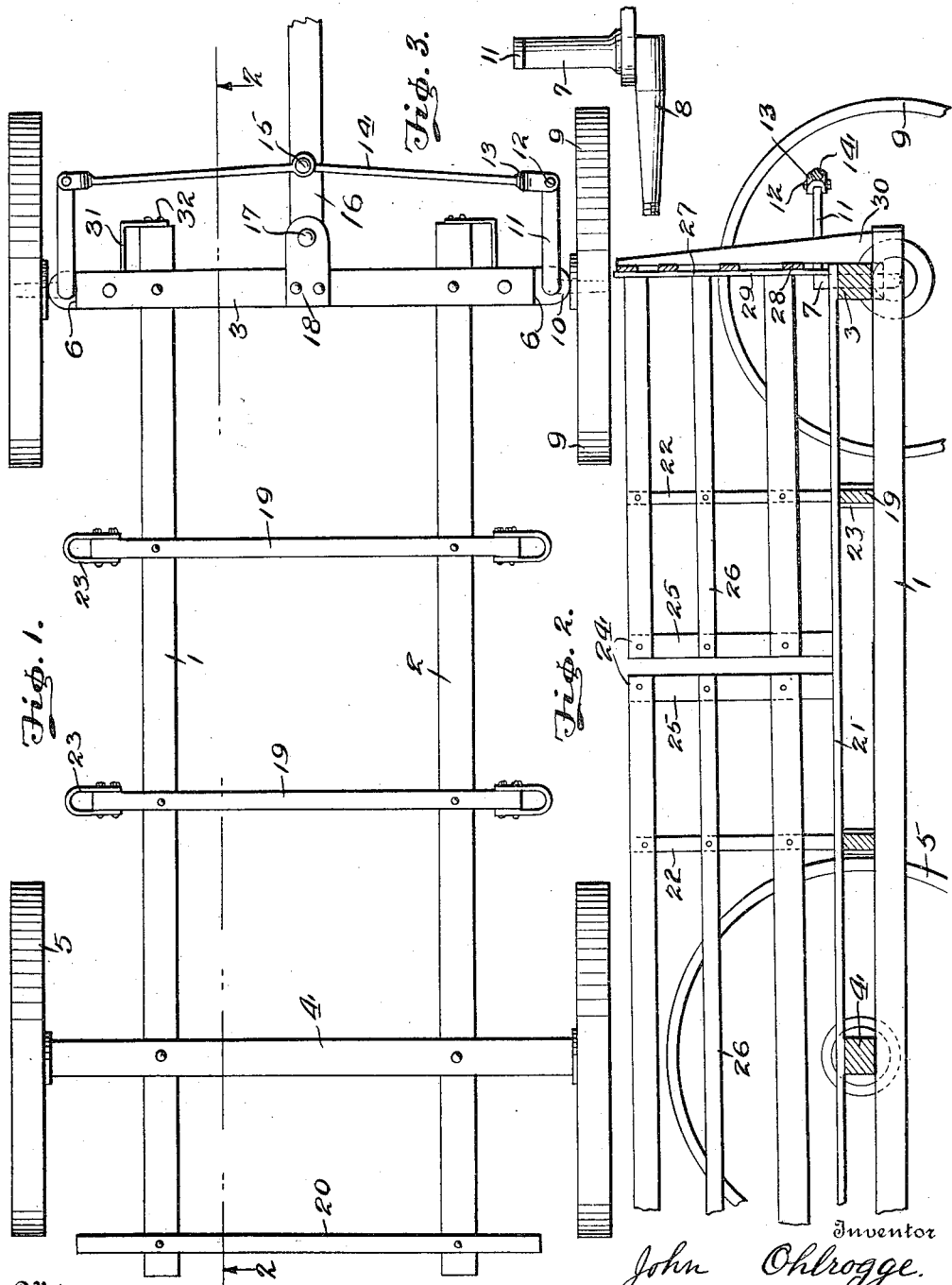

JOHN OHLROGGE, OF CHILTON, WISCONSIN.

WAGON.

1,252,714.  Specification of Letters Patent.  Patented Jan. 8, 1918.

Application filed August 3, 1915. Serial No. 43,470.

*To all whom it may concern:*

Be it known that I, JOHN OHLROGGE, a citizen of the United States, residing at Chilton, in the county of Calumet and State of Wisconsin, have invented certain new and useful Improvements in Wagons, of which the following is a specification.

My invention relates to wagons and more particularly to a rack especially adapted for use by farmers.

The primary object of my invention resides in the provision of an improved collapsible rack for association with the frame of a vehicle.

Another object of my invention resides in the provision of an improved means for associating the front wheels with the axle as well as the connecting means between the wheels and the tongue providing an arrangement whereby the tongue and wheels are moved simultaneously.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

In the drawings:

Figure 1 is a top plan view of my invention with the rack removed;

Fig. 2 is a longitudinal sectional view of my invention showing the rack in position thereon: and Fig. 3 is a detail of the front axle.

Referring more particularly to the drawings in which similar reference numerals designate like or corresponding parts throughout the different views, I provide a wagon frame including longitudinally spaced bars 1 and 2 for connecting the front axle 3 to the rear axle 4, the rear end of the frame being incidentally supported through the medium of wheels 5 rotatably mounted on the ends of the axle 4. The forward axle 3 has the respective ends reduced as at 6 and provided with openings through which are inserted the lower ends of upright cranks 7. The lower extremities of these cranks are rigidly associated with spindles 8 which incidentally rotatably receive wheels 9 for supporting the forward end of the frame. By the arrangement just described, it will be seen that the crank 7 adjacent the lower extremity thereof constitutes a bearing for supporting the spindles 8. The hubs of the wheels 9 are arranged in close relation with the rounded extremities 10 of the reduced ends of the axle 3, which rounded ends serve as a suitable means for guiding the wheels when they are being turned in a manner to be hereinafter described. The upper ends of the crank 7 are bent outwardly as at 11 to provide in effect a crank, the free terminals of these cranks having pivotally secured thereto through the medium of suitable fastening devices 12 the bifurcated ends 13 of connecting rods 14. The opposite or looped ends of these connecting rods are pivotally connected through the medium of a suitable fastening device 15 to a tongue 16. The inner end of the tongue is pivotally connected through the medium of a suitable fastening device 17 to a bracket 18 carried at a point substantially intermediate the ends of the front axle 3. It will now be appreciated that when the tongue is turned, because of the connection of the rods 14 and cranks 7 with the spindles, the front wheels will be moved simultaneously in the same direction that the tongue is moved.

In removably supporting my improved rack on the frame, cross bars 19 are secured in spaced relation between the front and rear axles to the side bars 1 and 2. Another cross bar 20 is arranged upon the upper surfaces of these bars 1 and 2 adjacent the rear ends thereof. The upper surfaces of the axles and cross bars are in alinement and are thus suitably arranged to receive a plurality of bars 21 which incidentally are positioned longitudinally of the frame and constitute the bottom of the rack. In order to prevent transverse movement of the bars 21 on the frame, I have provided supporting standards 22, the lower reduced ends being supported by clips 23 bolted or otherwise rigidly connected to the respective ends of the intermediate cross bars 19. Each of these standards 22 have rigidly connected thereto the side sections 24 of the rack. These sections 24 comprise end pieces 25 and spaced longitudinally arranged connecting bars 26. Arranged in abutting relation with the inner sides of the front ends of the forward sections 24 are the sides of the front 27 of the rack, the front comprising transverse bars 28 and vertical supporting bars 29. Standards 30 are rigidly connected to the front 29 of the rack adjacent the respective ends thereof, the lower ends of the standards being reduced and arranged between angle iron brackets 31, one portion of each of which is rigidly connected through the medium of suitable fastening devices 32 to the front edge of one of the longitudinally arranged supporting bars of the frame, the opposite portion being arranged in abutting relation with the axle 3.

Although I have shown and described the preferred embodiment of my invention, I desire to be understood that I am not to be limited to the exact details shown, however, I desire that great stress be laid upon the arrangement of the means for mounting the forward wheels and the tongue as well as the connecting means therebetween for facilitating the simultaneous movement of the wheels and tongue in the same direction. Attention is also directed to the peculiar yet novelly arranged form of rack which coöperates with the wagon frame.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent, is:—

A wagon frame, which comprises axle bars, spaced longitudinal sills connected to the under side of the axle bars, bars spaced longitudinally on and arranged transversely of the sills, said sills extending forwardly of and projecting beyond the front axle bar, certain of the transverse bars having clips at the outer ends, side sections having standards that are adapted to removably engage with the clips, angle bracket irons connecting the front ends of the sills with the front axle bar, a front section having standards that are adapted to be removably engaged with the iron, each of said standards being braced to stand vertically by having a bearing against the axle bar and one side of the sill, and a draft tongue pivotally secured to the front axle bar.

In testimony whereof I affix my signature in presence of two witnesses.

JOHN OHLROGGE.

Witnesses:
  JAMES KIMAN,
  HENRY STUMPINHORST.

Copies of this patent may be obtained for five cents each, by addressing the "Commissioner of Patents, Washington, D. C."